(12) United States Patent
Rouvinen et al.

(10) Patent No.: US 7,298,564 B2
(45) Date of Patent: Nov. 20, 2007

(54) DIGITAL CAMERA SYSTEM WITH PIEZOELECTRIC ACTUATORS

(75) Inventors: Jarkko Rouvinen, Espoo (FI); Ilpo Kauhaniemi, Vantaa (FI); Pentti Ahlgren, Helsinki (FI); Stefan Johansson, Uppsala (SE); Christer Mattsson, Norrtalje (SE)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 11/685,404

(22) Filed: Mar. 13, 2007

(65) Prior Publication Data
US 2007/0153404 A1 Jul. 5, 2007

Related U.S. Application Data

(63) Continuation of application No. 10/315,885, filed on Dec. 10, 2002, now Pat. No. 7,212,358, which is a continuation-in-part of application No. 10/163,111, filed on Jun. 5, 2002, now Pat. No. 6,710,950.

(51) Int. Cl.
*G02B 7/02* (2006.01)
*G02B 15/14* (2006.01)
*G02B 13/16* (2006.01)
*G03B 3/10* (2006.01)
*H01L 41/00* (2006.01)

(52) U.S. Cl. .................. 359/824; 359/823; 359/696; 396/133; 310/317; 310/323.02; 310/332; 310/328; 348/335; 348/345

(58) Field of Classification Search .......... 359/814, 359/822–824, 694–704; 396/52–55, 65, 396/79, 133, 137, 508; 310/317, 323.02, 310/323.17, 328, 332; 348/208.11, 335, 348/340.99, 345
See application file for complete search history.

(56) References Cited

U.S. PATENT DOCUMENTS

| 4,140,392 A | 2/1979 | Lacombat et al. |
| 4,291,958 A | 9/1981 | Frank et al. |
| 4,303,324 A | 12/1981 | Marcus |
| 5,101,278 A | 3/1992 | Itsumi et al. |
| 5,225,941 A | 7/1993 | Saito et al. |

(Continued)

FOREIGN PATENT DOCUMENTS

EP 0993055 A2 4/2000

(Continued)

OTHER PUBLICATIONS

Patent Abstract of Japan, EPO, Corresponding to Publication No. 10234192, Sep. 2, 1998.

(Continued)

*Primary Examiner*—Loha Ben
(74) *Attorney, Agent, or Firm*—Perman & Green, LLP (57) ABSTRACT

A digital camera is constructed with multiple lenses mounted in a pair of tubular elements which are nested together for relative axial movement. Movement is provided by piezoelectric actuators mounted externally to a support tube on flexible printed circuit board elements. Each lens tube is provided with a drive rail which extends at least partially over the length of the lens tube and projects radially outward from the periphery of each of the tubes. The rails are accessible to the engagement pads of the piezoelectric actuators to allow the transmission of drive forces to each of the tubes.

18 Claims, 6 Drawing Sheets

U.S. PATENT DOCUMENTS

| | | |
|---|---|---|
| 5,490,015 A | 2/1996 | Umeyama et al. |
| 5,583,602 A | 12/1996 | Yamamoto |
| 5,587,843 A | 12/1996 | Chen |
| 5,633,763 A | 5/1997 | Suzuki et al. |
| 5,675,444 A | 10/1997 | Ueyama et al. |
| 5,745,800 A | 4/1998 | Kanbara et al. |
| 6,067,421 A | 5/2000 | Kitazawa et al. |
| 6,249,093 B1 * | 6/2001 | Takahata et al. ............ 318/129 |
| 6,392,827 B1 | 5/2002 | Ueyama et al. |
| 6,437,485 B1 | 8/2002 | Johansson |
| 6,566,790 B1 * | 5/2003 | Serita ......................... 310/328 |
| 6,947,091 B1 | 9/2005 | Widmann et al. |

FOREIGN PATENT DOCUMENTS

| | | |
|---|---|---|
| JP | 05107440 | 4/1993 |
| JP | 010234192 | 9/1998 |
| SE | 510153 C2 | 4/1999 |

OTHER PUBLICATIONS

Patent Abstract of Japan, EPO, Corresponding to Publication No. 0517440, Apr. 30, 1993.

* cited by examiner

DIGITAL CAMERA SYSTEM WITH PIEZOELECTRIC ACTUATORS

RELATED APPLICATIONS

This application is a continuation application based on continuation-in-part application Ser. No. 10/315,885, filed Dec. 10, 2002, now U.S. Pat. No. 7,212,358 which is based on U.S. patent application Ser. No. 10/163,111, filed on Jun. 5, 2002, now U.S. Pat. No. 6,710,950 and Applicant claims priority and to the benefit of each.

BACKGROUND

1. Field of the Invention

The present invention relates to an assembly of optical components for a miniature digital camera, including piezoelectric actuators for moving the optical components to provide focusing, zoom, and other functions. In particular an arrangement of the components is described that reduces the overall size and facilitates assembly.

2. Brief Description of Related Developments

The components of electronic cameras require low power consumption, low weight and cost efficiency. These design criteria are challenged by the demand for optically adjustable cameras that provide autofocus, zoom optics, or both. These features require the relative movement of optical elements to provide the adjustment. The required motion is typically linear but may use a rotating motor combined with a motion-converting mechanism such as a lead-screw. The motion range is often in the order of millimeters. It is a purpose of this invention to provide a mechanism for adjusting the position of the optical elements in an electronic camera.

One component that has been used in numerous applications is a bimorph piezoelectric element, such elements are constructed of multiple layers of piezoelectric material wherein each layer is connected for independent excitation. In U.S. Pat. No. 4,291,958, a bimorph piezoelectric cantilever beam is used in combination with a magnifying lever for focusing a camera. However, the necessary stroke of such a focusing device results in a poor stiffness of the device. In electronic camera applications, space is a crucial factor. There is thus a need for simple drive elements that can operate in narrow spaces with limited mechanical support. It is a purpose of this invention to utilize a bimorph piezoelectric element to adjust the position of a lens in an optical system of a digital camera.

A camera system using a piezoelectric actuator is described in commonly owned, related U.S. Pat. No. 6,710,950, referenced above. The disclosure of this application is incorporated herein by reference. In this application, a lens element is mounted within a camera on a tubular member. The lens tube is in turn mounted on a support tube for movement along the longitudinal axis of the tubular member. The adjustment movement is provided by means of multiple bimorph piezoelectric elements, for example by three elements, spaced symmetrically around the circumference of the support tube. The piezoelectric elements are connected to and mounted on a flexible printed circuit board which may contain other electronic components associated with the lens drive system. The flexible printed circuit board is mounted on the support tube and is in turn connected to a voltage source such as a battery. The flexibility of the printed circuit board allows it to be formed to the shape of the support tube and for the piezoelectric element to be positioned in engagement with the lens tube.

The bimorph piezoelectric element used in the mechanism of the cited application is constructed of at least two layers of piezoelectric material which are independently energized to provide relative deformation between the two layers. This piezoelectric element is formed in the shape of a beam having an engagement pad extending transverse to the plane of the element from its midpoint. The beam is fixed to the circuit board close to ends or nodal positions. The beam comprises a pair of bimorph piezoelectric elements extending to either side of the engagement pad. Each of the bimorph elements have dual active layers. The differential deformation generated by energizing only one of the two layers will cause the piezoelectric elements to bend, moving the outer end of the engagement pad into contact with the movable lens tube. By altering the excitation of the piezoelectric elements, the engagement pad causes movement in an axial direction, thereby adjusting the position of the lens. A pattern of excitation is devised to provide movement in discrete steps.

In the system of the cited application, a processor is connected in the printed circuit board to provide the main control for the digital camera and is constructed to generate a drive voltage pattern in accordance with the desired movement of the lens.

The movement generated by the piezoelectric element provides a high resolution, but there are no structural features that provide a reference in order to obtain accurate repeatability. The step length provided by the piezoelectric element can vary with operational and environmental conditions. In order to obtain the precision required in some optical designs, a position sensor is used to monitor the position of the movable tubes. An optical sensor is used to view a reflecting surface which is mounted on the moveable tube. The reflecting surface consists of a gray-scale incorporated into the surface treatment of the moveable tube. This configuration will provide accurate positional monitoring of a moveable tube.

It is a purpose of this invention to provide a miniature digital camera system of the type described above in which the components are arranged to facilitate their assembly in an over all package that is smaller. It is another purpose of this invention to provide a rail system external to the lens support tubes for engagement by piezoelectric actuators.

SUMMARY

A digital camera is constructed with multiple lens mounted in a pair of tubular elements which are nested together for relative axial movement to provide a zoom function. The lens tube assembly is in turn mounted on a support tube. The lens tube assembly is moveable within said support tube with respect to an image plane to provide an autofocus function. Movement is provided by piezoelectric actuators mounted externally to the support tube on flexible printed circuit board elements. Each lens tube is provided with a drive rail which extends at least partially along the length of the lens tube and project radially outward from the periphery of each of the tubes. The rails are accessible to the engagement pads of the piezoelectric actuators to allow the transmission of drive forces to each of the tubes. Slots are constructed in the support tube to allow the drive rails to project through the support tube. The piezoelectric actuators are mounted to permit engagement by a pair of actuators on either side of the rail.

The rails are constructed having a wedge shaped cross section which narrows radially inward towards the axis of the system. The piezoelectric elements are mounted on opposing surfaces of U-shaped flexible printed circuit boards with a rail in between. In this manner, the piezoelectric elements are positioned for engagement with the tapered sides of the rail. A spring clip is provided in which is secured the printed circuit board. The clip exerts a spring force on the printed circuit board to bias the piezoelectric elements into engagement with the rail. This bias force also has a radial component which is applied outward on the tube element to maintain the tubes in axial alignment and minimize binding. Position sensors are mounted on the U-shaped printed circuit board in optical communication with reflective surfaces of respective lens tubes.

In one embodiment, the rails are positioned concentrically on the tube assembly. In a second embodiment the rails are positioned in the same quadrant of the tube assembly circumference. In the latter embodiment the engagement forces are applied eccentrically to the tube elements. To assist in maintaining tube alignment, wedge shaped grooves and mating surfaces are formed on the engaging surfaces of the lens tube assembly and the support tube.

BRIEF DESCRIPTION OF THE DRAWINGS

The digital camera system of this invention is explained in more detail below with reference to the accompanying drawing, in which.

DESCRIPTION OF THE PREFERRED EMBODIMENT

Figure 1:
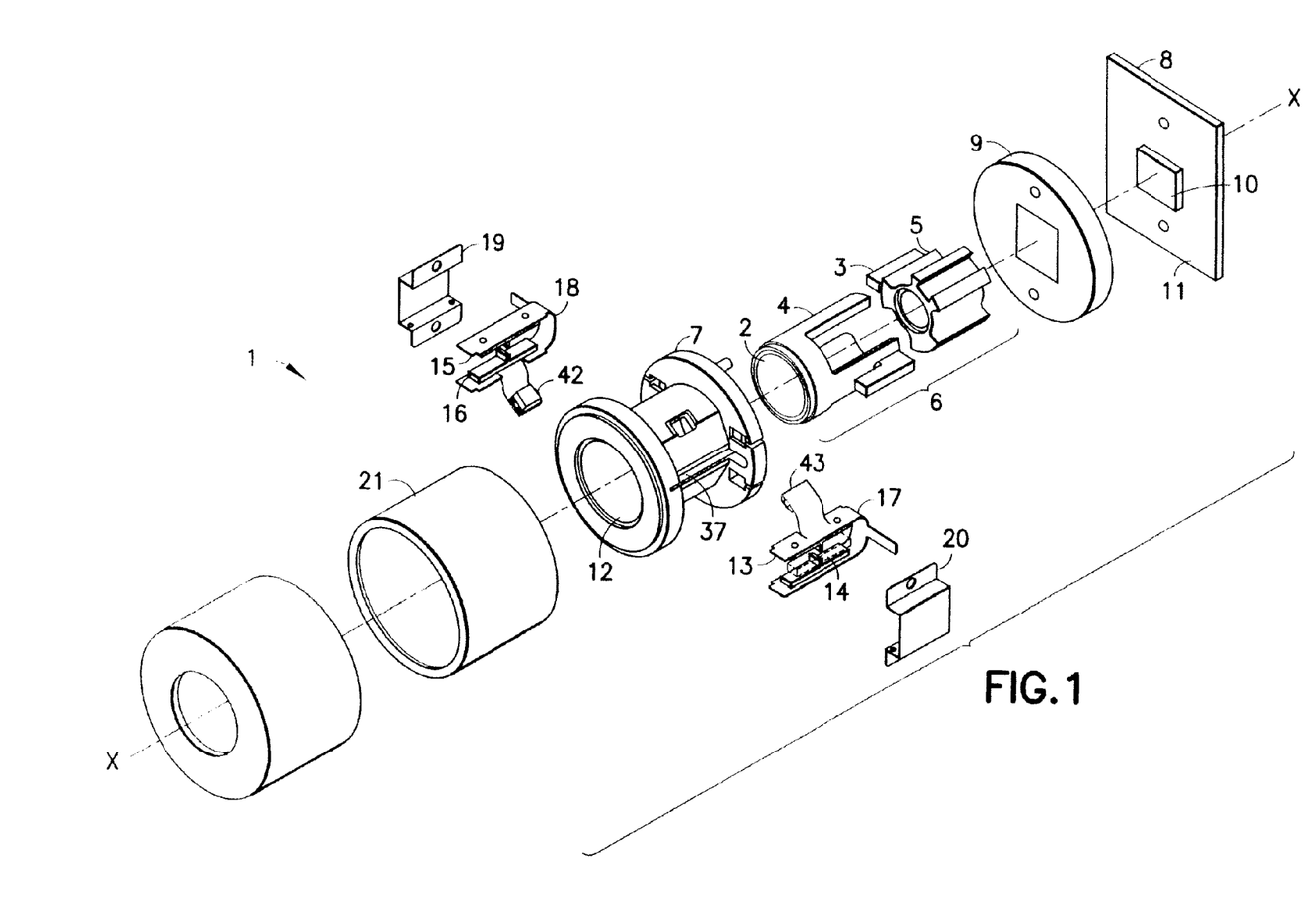
FIG. 1 is an axially exploded, perspective view of an embodiment of a camera system, according to this invention.

Referring to FIG. 1, a digital camera 1 is constructed with a pair of lens systems 2 and 3 mounted in a pair of tubular elements 4 and 5. Lens tubes 4 and 5 are nested together for relative movement along axis x-x to provide a multiple optical functions, such as auto focus and zoom. The assembled lens tubes 4 and 5, assembly 6, is in turn mounted on a support tube 7 for axial movement within said support tube 7 with respect to an image plane 8. A filter 9 may be positioned in front of image plane 8. An image sensor 10 is mounted on main circuit board 11 on which may also be mounted the control and processing components of the digital camera. Lens tubes 2 and 3 may have multiple cooperating lens mounted within.

Support tube 7 is constructed to receive the lens tubes 4 and 5 in an interior passage 12. Movement is provided by piezoelectric actuators 13-16 mounted externally to the support tube on flexible printed circuit board elements 17 and 18. Spring clip mounting brackets 19 and 20 secure the piezoelectric modules in place within a cover tube 21.

Figure 2:
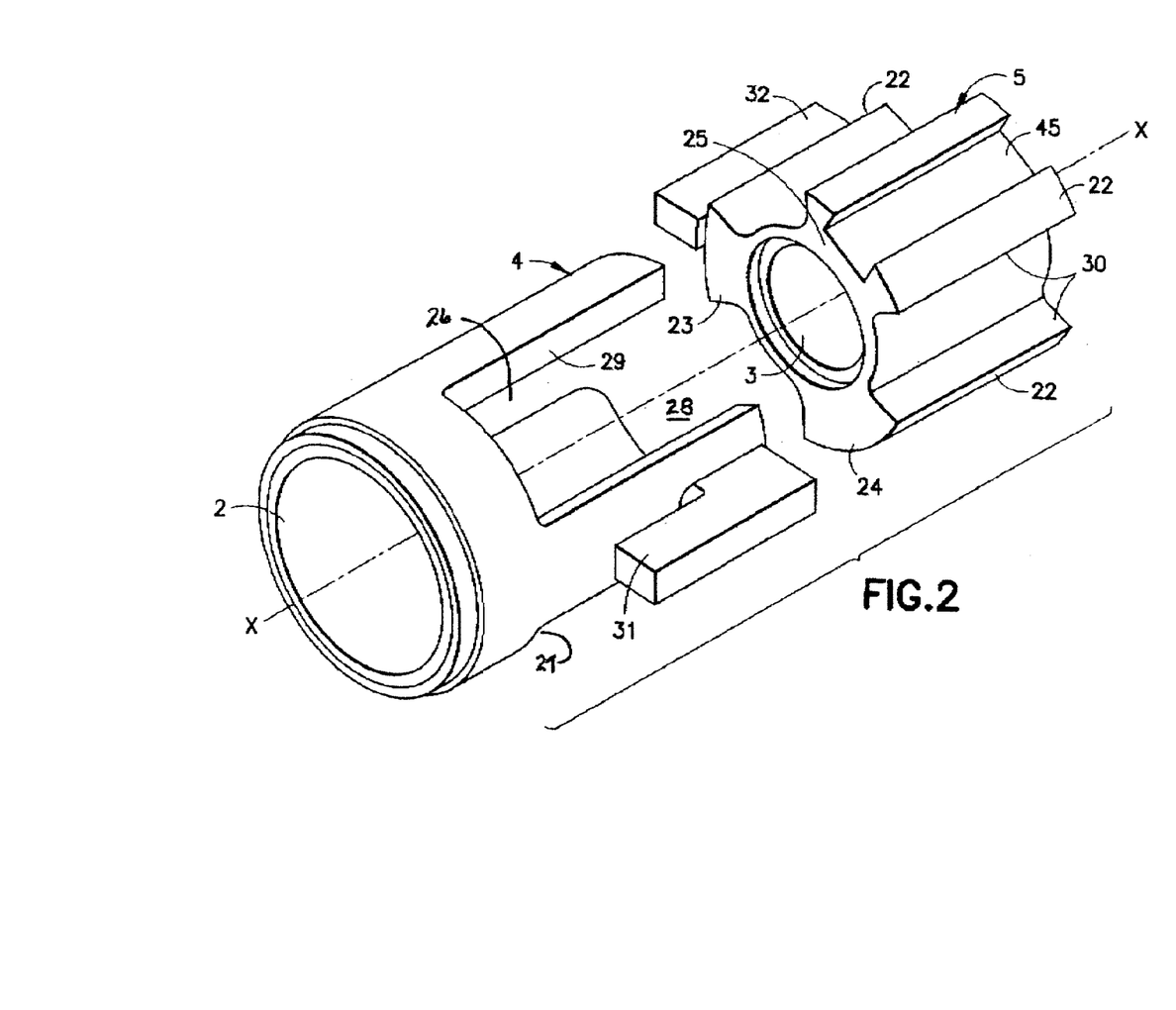
FIG. 2 is an enlarged, exploded perspective view of the lens elements of FIG. 1.

Referring to FIG. 2, lens tubes 4 and 5 are nested together for sliding movement. As shown lens tube 5 is constructed with rounded surfaces 22 provided on the outer periphery of a trio of projections 23-25. The projections 23-25 extend through mating slots 26-28 in lens tube 4. Slots 26-28 are constructed with tapered surfaces 29 which engage opposing tapered surfaces 30 on projections 23-25.

Figure 3:
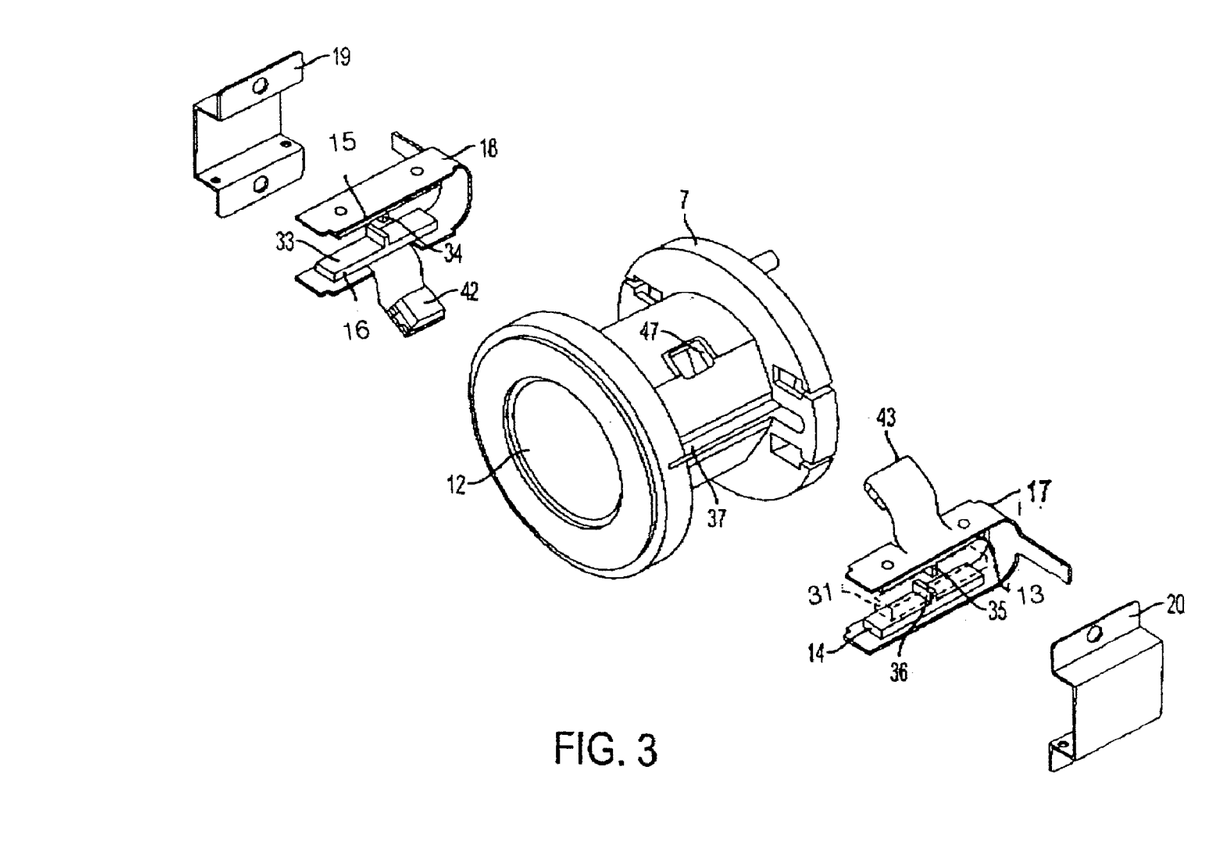
FIG. 3 is an enlarged exploded perspective view of the piezoelectric drive system of FIG. 1.

Each of lens tubes 4 and 5 is provided with a drive rail 31 and 32 respectively which extends at least partially over the length of the lens tubes 4 and 5 and project radially outward from the periphery of each of the tubes. As shown in FIG. 3, the rails 31 and 32 are accessible to the engagement pads 33-36 of the piezoelectric actuators 13-16 to allow the transmission of drive forces to each of the tubes 4 and 5. Slots 37 are constructed in the support tube 7 to allow the drive rails 31 and 32 to project through the support tube 7.

As shown in FIG. 3, the piezoelectric actuators 13-16 are independently mounted on flexible printed circuit boards 17 and 18. Printed circuit boards 17 and 18 are formed in the shape of a U having opposing arms 40 and 41. The printed circuit boards 17 and 18 are constructed having circuit paths (not shown) to supply power to the piezoelectric actuators 13-16. Optical sensors 42 and 43 may also be fixed to the printed circuit boards 17 and 18. As shown, the actuators 13-16 are mounted in pairs on opposing arms 40 and 41. The assembly is fixed to the support tube 7 in a position to permit engagement by a pair of actuators, such as 15 and 16, on either side of the rails 31 and 32.

Figure 4A:
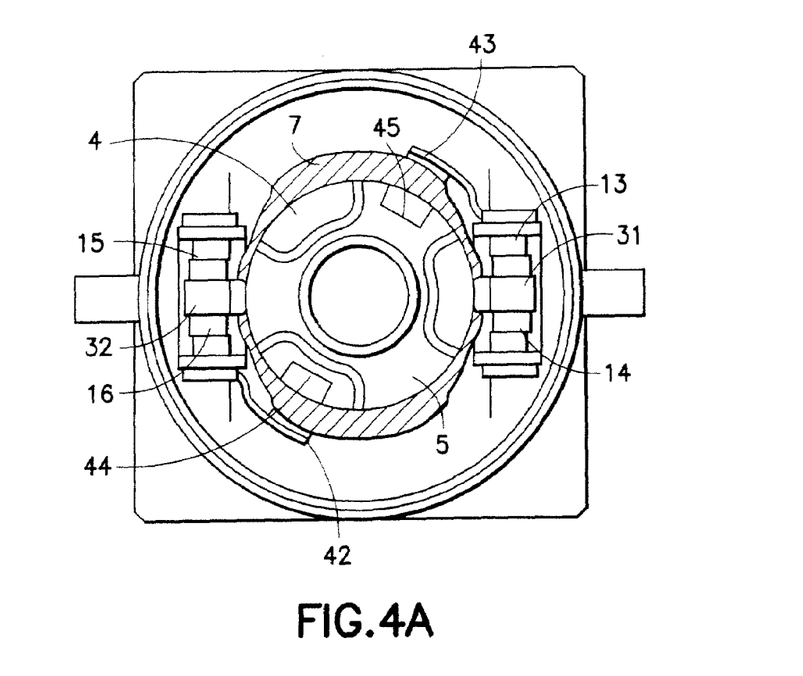
FIG. 4a is a transverse sectional view of the embodiment of this invention shown in FIG. 1, taken along section lines 4A-4A of FIG. 4b.
Figure 4B:
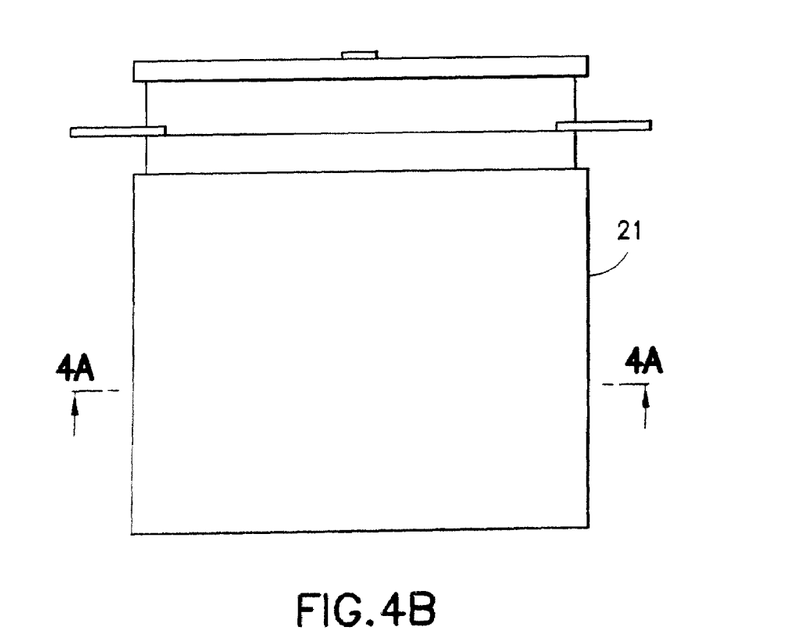
FIG. 4b is a side view of the assembled optical assembly of FIG. 1.

In one embodiment, as shown in FIG. 4a, the rails 31 and 32 are constructed having a wedge shaped cross section which narrows radially inward towards the axis of the system. The piezoelectric elements 13-16 are mounted on opposing surfaces of U-shaped flexible printed circuit boards 17 and 18 with a rail 31 or 32 in between. In this manner, the piezoelectric elements are positioned for engagement with the tapered sides of the rail. Spring clips 19 and 20 are provided in which are secured the printed circuit boards 17 and 18. The spring clips 19 and 20 exert a spring force on the printed circuit boards to bias the piezoelectric elements into engagement with their respective rail. This bias force also has a radial component which is applied outward on the tube element to maintain the tubes in axial alignment and minimize binding. Optical sensors 42 and 43 are mounted on the U-shaped printed circuit boards in optical communication with reflective surfaces 44 and 45 of respective lens tubes 4 and 5. As shown in FIG. 3, sensor ports 46 (not shown) and 47 are provided in support tube 7 to provide access for the optical sensors 42 and 43. The optical sensors are responsive to provide a position indication for the lens tubes as they are moved by actuators 13-16. Optical sensors are shown for illustration, but other types of position sensors may be adapted for the same purpose, for example, a resistive position sensor.

For illustration of the basic structure of this invention, two lens tubes are shown, however, it should be understood, that more complex lens configurations may be constructed which would require a greater number of lens tubes. Multiple lens tubes may be nested for relative movement and driven as shown and described in this application. Each of the lens tubes may contain lens system comprised of multiple lens elements.

Figure 5:
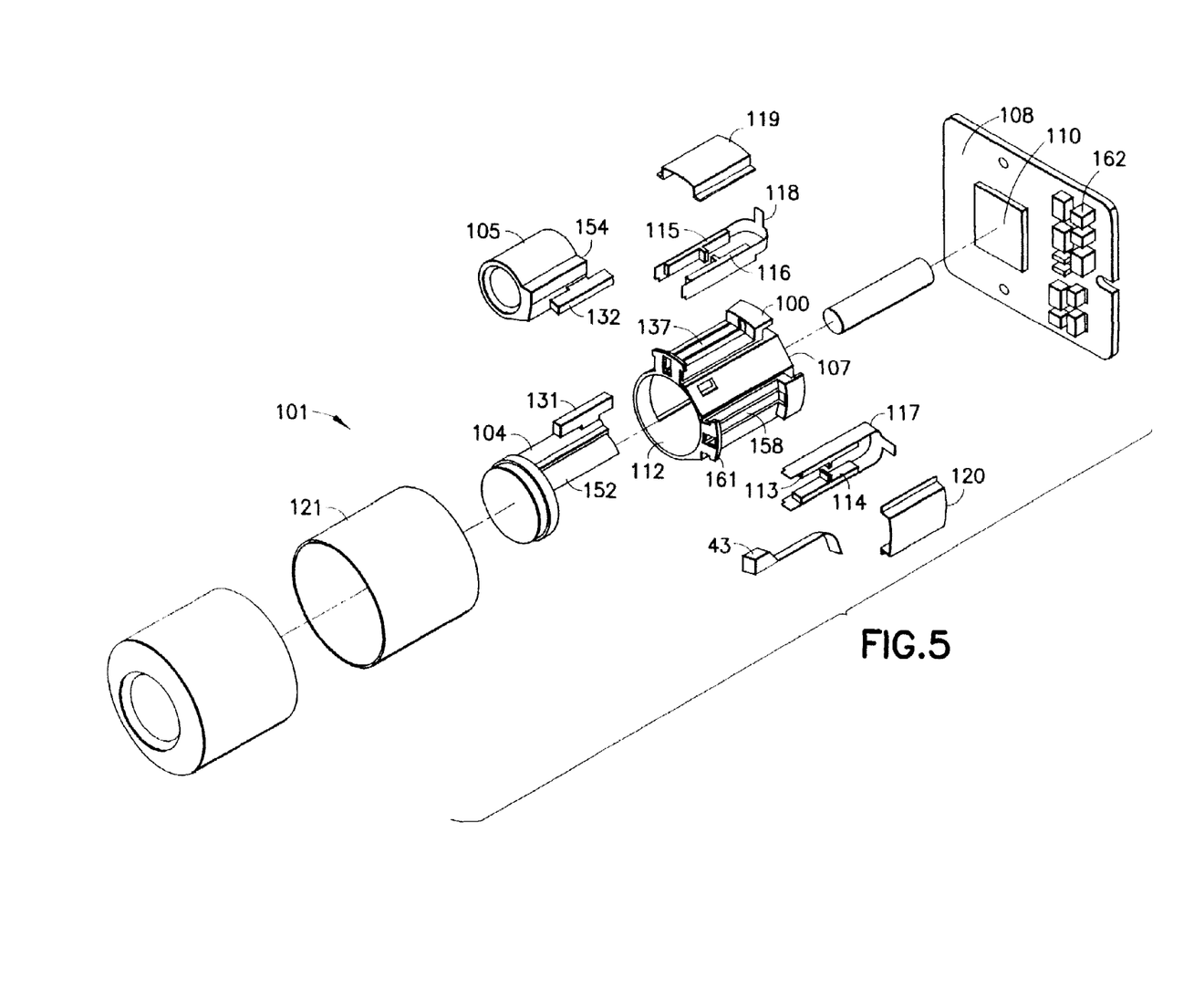
FIG. 5 is an axially exploded, perspective view of an embodiment of a camera system, according to an alternative embodiment of this invention.
Figure 6:
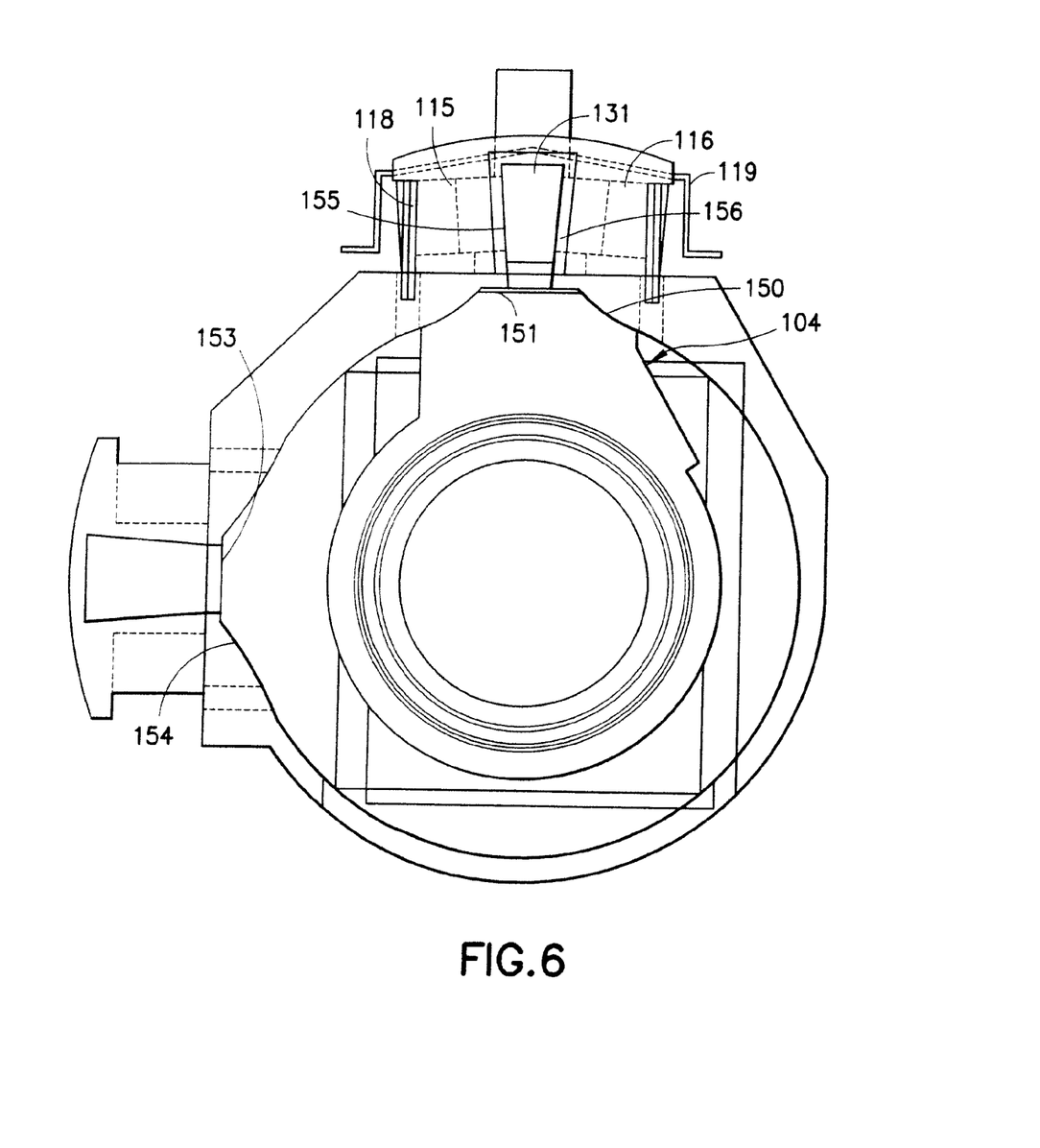
FIG. 6 is a transverse sectional view of the alternate embodiment of this invention shown in FIG. 5.

In one embodiment, the rails are positioned concentrically on the tube assembly, as shown in FIG. 1. In a second embodiment the rails are positioned in the same quadrant of the tube assembly circumference, as shown in FIGS. 5 and 6. In the latter embodiment the engagement forces are applied eccentrically to the tube elements. To assist in maintaining tube alignment, wedge shaped grooves 150 and 154 and mating surfaces 151 and 153 are formed on the engaging surfaces of the lens tube assembly and the support tube, as shown in FIG. 6.

Referring FIG. 5, the optical system 101 of the second embodiment is constructed with dual lens tubes 104 and 105. Lens tubes 104 and 105 contain the lenses of the optical system 101 mounted within support tube 107. A cover tube 121 encloses the optical assembly. More lens tubes could be employed if a more complex optical system, i.e., more lenses, is desired.

Similarly to the first embodiment, the optical system 101 is mounted on printed circuit board 108 to transmit light from an image (not shown) to an image sensor 110 at a image plane 111. The printed circuit board may also contain the control circuit 162 for the digital camera and provide means to connect the optical system to a power source such as a battery.

Lens tubes 104 and 105 are nested for movement along axis y-y within support tube 107. This movement includes sliding movement of lens tube 105 relative to lens tube 104 and movement of the lens tube 104 within support tube 107. In the embodiment of FIGS. 5 and 6, the lens tubes are nested in a different manner. Lens tube 104 has only a partial tubular surface 152 which has an outer surface 151 for engagement with a groove 150 on the inner surface of passage 112 in support tube 107. The engaging surfaces provide a track in which the lens tube 104 is moved by the action of piezoelectric elements 115 and 116. A rail 131 is constructed on the surface 152, extending radially upward according to FIG. 6. Rail 131 extends through a slot 137 constructed for this purpose in support tube 107. Rail 131 is shaped with a wedge shaped cross section which provides surfaces for the engagement of the piezoelectric actuators 115 and 116. These slanted surfaces 155 and 156 cause the engagement force of the piezoelectric actuators 115 and 116 to apply a radial outward component of force, which tends to maintain alignment of the lens tube 104 within the groove 150.

Lens tube 105 may be assembled by insertion through opening 157 in support tube 107 in a motion transverse to the axis y-y. Lens tube 105 is also constructed with an engagement surface 153 which extends axially on its outer periphery. A groove 154 is constructed in the inner surface of passage 112 approximately 90° from groove 150 to receive engagement surface 153. A rail 132 extends radially outward from surface 153 through a slot 158 constructed in support tube 107.

In a manner similar to the first embodiment piezoelectric actuators 113-116 are mounted on the opposing surfaces of U-shaped printed circuit boards 117 and 118. Circuit boards 117 and 118 are secured to support tube 107 by spring clips 119 and 120. A pair of outward extending flanges 160 and 161 may be formed on support tube 107 to receive printed circuit boards 117 and 118. Clips 119 and 120 engage the flanges to secure the circuit boards in place. As shown in FIG. 6, piezoelectric actuators 115 and 116 engage slanted surfaces 155 and 156 of rail 131 and are urged into engagement by bias force exerted by spring clip 119. The radial component of this force urges the optical tube 104 outward and into engagement with groove 152. An identical assembly secures the piezoelectric actuators 113 and 114 on support tube 107 and urges the actuators into engagement with rail 132.

The configuration and operation of the piezoelectric elements are described in more detail in the parent application referenced above and incorporated herein.

We claim:

1. A digital camera comprising:
   an image sensor in operative association with a processor for processing image signals received by the image sensor;
   a support tube having a longitudinal axis, the support tube being secured within the camera;
   at least one lens element fixed on a first lens tube and positioned to collect and transmit image signals to the image sensor, the first lens tube being mounted coaxially on the support tube for axial movement thereon, to allow movement of the at least one lens element;
   a drive rail fixed to the first lens tube and extending radially outward therefrom; and
   at least one piezoelectric actuator mounted on the support tube in operative association with the drive rail, wherein the at least one piezoelectric actuator engages the drive rail to cause axial movement of the first lens tube.

2. A digital camera, as described in claim 1, wherein the at least one piezoelectric actuator is mounted on a flexible printed circuit board.

3. A digital camera, as described in claim 2, wherein the printed circuit board is substantially U-shaped and wherein the at least one piezoelectric actuator comprises:
   a pair of piezoelectric elements mounted on opposing surfaces of the U-shaped printed circuit board wherein the U-shaped printed circuit board is mounted on the support tube with the drive rail extending between the elements.

4. A digital camera, as described in claim 1, further comprising a position sensor mounted on the support tube in operative association with the first lens tube to monitor the axial position of the first lens element.

5. A digital camera, as described in claim 4, wherein the position sensor comprises an optical sensor in line of sight communication with the first lens tube through the support tube.

6. A digital camera, as described in claim 4, wherein the position sensor is mounted on the flexible printed circuit board.

7. A digital camera, as described in claim 1, further comprising:
   a second lens element fixed on a second lens tube and positioned to collect and transmit image signals to the image sensor, the second lens tube being mounted coaxially on the support tube for axial movement thereon, to allow movement of the second lens element;
   a second drive rail fixed to the second lens tube and extending radially outward therefrom; and
   a second piezoelectric actuator mounted on the support tube in operative association with the second drive rail, wherein the second piezoelectric actuator engages the second drive rail to cause axial movement of the second lens tube.

8. A digital camera, as described in claim 7, wherein second piezoelectric actuator in operative association with the second lens tube is mounted on a second flexible printed circuit board.

9. A digital camera, as described in claim 8, wherein the second flexible printed circuit board is substantially U-shaped and wherein the second piezoelectric actuator comprises:
   a pair of piezoelectric elements mounted on opposing surfaces of the U-shaped printed circuit board wherein the U-shaped printed circuit board is mounted on the support tube with the second drive rail extending between the elements.

10. A digital camera, as described in claim 7, further comprising a second position sensor mounted on the support tube in operative association with the second lens tube to monitor the axial position of the second lens element.

11. A digital camera, as described in claim 10, wherein the second position sensor comprises an optical sensor in line of sight communication with the second lens tube through the support tube.

12. A digital camera, as described in claim 10, wherein the second position sensor is mounted on the second flexible printed circuit board.

13. A method of adjusting the relative position of a lens assembly in a digital camera comprising:
    positioning an image sensor relative to the lens assembly to receive an image signal therefrom;
    securing a support tube having a longitudinal axis within the camera;
    mounting a lens element of the lens assembly on a first lens tube for movement on the support tube in a position adapted to collect and transmit image signals to the image sensor, the first lens tube being mounted coaxially on the support tube for axial movement thereon;
    constructing a drive rail connected to the first lens tube, extending radially outward therefrom:
    engaging the drive rail in operative association with at least one piezoelectric actuator, the piezoelectric actuator adapted to drive the first lens tube in axial movement when energized.

14. The method according to claim 13 further comprising:
    constructing a second lens tube in which at least one second lens element is fixed, the second lens tube being mounted on the support tube for axial movement relative to the first lens tube, the second lens tube having a second drive rail fixed to the second lens tube and extending radially outward therefrom; and
    engaging the second drive rail in operative association with a second piezoelectric actuator, wherein the second piezoelectric actuator is adapted to drive the second lens tube in axial movement when energized.

15. The method according to claim 13 further comprising sensing the position of the first lens tube on the support tube.

16. The method according to claim 14 further comprising sensing the position of the second lens tube on the support tube.

17. A system for controlling a digital camera comprising:
    an image sensor in operative association with a processor for processing image signals received by the image sensor;
    a support tube having a longitudinal axis, the support tube being secured within the camera;
    at least one lens element fixed on a first lens tube and positioned to collect and transmit image signals to the image sensor, the first lens tube being mounted coaxially on the support tube for axial movement thereon to provide movement of the at least one lens element relative to the image sensor;
    a drive rail fixed to the first lens tube and extending radially outward therefrom;
    at least one piezoelectric actuator mounted on the support tube in operative association with the drive rail, wherein the at least one piezoelectric actuator engages the drive rail to cause axial movement of the first lens tube;
    a position sensor to sense the position of the first lens tube; and
    an actuator control adapted to generate signals for causing the at least one piezoelectric actuator to drive the first lens tube in axial movement in cooperation with the position sensor.

18. A system for controlling a digital camera, as described in claim 17, further comprising:
    a second lens element fixed on a second lens tube and positioned to collect and transmit image signals to the image sensor, the second lens tube being mounted coaxially on the support tube for axial movement thereon to allow movement of the second lens element;
    a second drive rail fixed to the second lens tube and extending radially outward therefrom;
    a second piezoelectric actuator mounted on the support tube in operative association with the second drive rail, wherein the second piezoelectric actuator engages the second drive rail to cause axial movement of the second lens tube;
    a second position sensor to sense the position of the second lens tube; and
    wherein the actuator control is further adapted to generate signals for causing the second actuator to drive the second lens tube in axial movement in cooperation with the second position sensor.

* * * * *